(12) United States Patent
Gu et al.

(10) Patent No.: US 9,103,234 B2
(45) Date of Patent: Aug. 11, 2015

(54) HRSG FOR FLUIDIZED GASIFICATION

(75) Inventors: Minghai Gu, Shanghai (CN); Songliang Sun, Shanghai (CN); Guangliang Luo, Shanghai (CN)

(73) Assignee: Synthesis Energy Systems, Inc., Houston, TX (US)

( * ) Notice: Subject to any disclaimer, the term of this patent is extended or adjusted under 35 U.S.C. 154(b) by 722 days.

(21) Appl. No.: 12/994,851

(22) PCT Filed: May 25, 2009

(86) PCT No.: PCT/CN2009/000579
§ 371 (c)(1),
(2), (4) Date: Jun. 3, 2011

(87) PCT Pub. No.: WO2009/143700
PCT Pub. Date: Dec. 3, 2009

(65) Prior Publication Data
US 2011/0283703 A1    Nov. 24, 2011

(30) Foreign Application Priority Data

May 27, 2008 (CN) .......................... 2008 1 0109532

(51) Int. Cl.
| | |
|---|---|
| *F01K 13/02* | (2006.01) |
| *F01K 23/06* | (2006.01) |
| *F22B 9/00* | (2006.01) |
| *F02B 59/00* | (2006.01) |
| *C10J 3/48* | (2006.01) |
| *F22B 11/02* | (2006.01) |
| *F28F 9/02* | (2006.01) |
| *F28D 7/00* | (2006.01) |
| *F28D 7/08* | (2006.01) |
| *F28D 7/16* | (2006.01) |
| *F28F 21/08* | (2006.01) |

(52) U.S. Cl.
CPC .............. *F01K 23/067* (2013.01); *C10J 3/482* (2013.01); *F22B 11/02* (2013.01); *F28F 9/0219* (2013.01); *F28F 9/0241* (2013.01); *C10J 2300/1687* (2013.01); *F28D 7/0066* (2013.01); *F28D 7/08* (2013.01); *F28D 7/16* (2013.01); *F28F 21/08* (2013.01); *Y02E 20/18* (2013.01)

(58) Field of Classification Search
USPC .............. 60/660, 39.182, 779, 39.12; 122/53, 122/103, 130, 266, 44.1, 50
See application file for complete search history.

(56) References Cited

U.S. PATENT DOCUMENTS

| | | | | |
|---|---|---|---|---|
| 1,327,188 A | * | 1/1920 | Balster | 122/209.1 |
| 1,421,902 A | * | 7/1922 | Brown | 122/451 R |
| 2,818,048 A | * | 12/1957 | Ross | 122/42 |

(Continued)

FOREIGN PATENT DOCUMENTS

GB    2068513 A  *  8/1981  .............. F22B 11/04

*Primary Examiner* — Kenneth Bomberg
*Assistant Examiner* — Daniel Wagnitz
(74) *Attorney, Agent, or Firm* — Kening Li; Miller Canfield

(57) ABSTRACT

An HRSG for fluidized bed gasification comprises a high temperature evaporator (200), a superheater (300), a low temperature evaporator (400), and an economizer (500) connected in series. The superheater (300), the low temperature evaporator (400) and the economizer (500) have a water-tube structure, and the high temperature evaporator (200) has a fire-tube structure. The HRSG of the present invention allows efficient heat recovery from the raw syngas of a fluidized bed coal gasifier, while avoids or reduces the corrosion of and damage to the components of the HRSG caused by high-speed ash particles in the syngas.

7 Claims, 2 Drawing Sheets

(56) References Cited

U.S. PATENT DOCUMENTS

| | | | |
|---|---|---|---|
| 3,638,620 A * | 2/1972 | Ostbo | 122/115 |
| 4,398,501 A * | 8/1983 | Mischiatti | 122/7 R |
| 4,875,436 A * | 10/1989 | Smith et al. | 122/7 R |
| 4,976,100 A * | 12/1990 | Lee | 60/772 |
| 5,564,269 A * | 10/1996 | Briesch | 60/775 |
| 6,548,197 B1 * | 4/2003 | Chandran et al. | 429/423 |
| 2004/0079087 A1 * | 4/2004 | Chandran et al. | 60/781 |
| 2004/0182000 A1 * | 9/2004 | Mansour et al. | 48/197 FM |
| 2006/0053791 A1 * | 3/2006 | Prentice, III | 60/645 |
| 2007/0012045 A1 * | 1/2007 | Chandran et al. | 60/781 |

* cited by examiner

HRSG FOR FLUIDIZED GASIFICATION

FIELD OF THE INVENTION

This invention relates to a Heat Recovery Steam Generator (hereafter "HRSG"), and in particular, to an HRSG for fluidized bed coal gasification.

BACKGROUND OF THE INVENTION

An HRSG is a heat exchanger to produce steam utilizing waste heat as heat source, and it is not only used for cooling, but also for providing waste heat to produce steam. Structurally, an HRSG may be classified as a shell-and-tube type, or a gas-pass type depending on whether the high temperature gas flows inside or outside a heat exchange tube. In a shell-and-tube HRSG, also called fire-tube HRSG, flue gas flows inside a heat exchange tube and water flows in a shell outside the heat exchange tube. Heat is transferred to water outside the tube through the tube wall. Generally, a shell-and-tube HRSG does not comprise a superheater section or an economizer section because water is simply evaporated. A large-sized shell-and-tube HRSG comprises a steam drum, a downcomer and a riser, while a small shell-and-tube HRSG uses the space in the top of the boiler shell to separate steam and water. In fact, a shell-and-tube HRSG is similar to the shell-and-tube heat exchanger in terms of structure, and also includes fixed tube sheet type, floating head type, U-shaped tube type. In a gas-pass HRSG, also called as water-tube HRSG, water or steam flows inside a heat exchange tube and flue gas flows in a gas pass outside the tube. The flue gas transfers heat to the water or steam in the tube through the heat exchange tube. Generally, a water-tube HRSG comprises a superheater section, an evaporator section, an economizer section, a steam drum, a downcomer, and a riser.

Raw syngas cooling is a commonly used process in fluidized bed coal gasification. The temperature of the raw syngas produced from a coal gasifier ranges from 850° C. to 1,000° C. and the raw syngas must go through dust removal and cooling processes before desulfurizing in the next stage in order to obtain clean syngas. In the prior art, the HRSG for fluidized bed coal gasification comprises a high temperature evaporator, a superheater, a low temperature evaporator, and an economizer, wherein the high temperature evaporator, the superheater, the low temperature evaporator, and the economizer all have the fire-tube structure. For example, a heat-tube HRSG with such a fire-tube boiler structure is disclosed in a Chinese utility model application with publication No. CN2426069.

However, due to the high contents of coal ashes and semi-cokes in the syngas produced from fluidized bed coal gasification, the fire-tube boiler inlets of the superheater, the low temperature evaporator and the economizer are bombarded by these coal ashes and semi-cokes, resulting in abrasion thereon, pipe leakage and system shutdown.

Further, because the existing high temperature evaporator is a vertically straight fire-tube boiler, gases and part of the steam produced by desalted water float to the top of the fire tube assembly of the high temperature evaporator, which will result in local overheating and damage of the tube sheet and the fire tube assembly.

Also, conventionally, the high temperature evaporator, superheater, low temperature evaporator, and economizer are separately located, and occupy a large space, making it difficult and troublesome to maintain to repair.

In the prior art, the economizer is made of carbon steel, which will result in dew corrosion on the outer surface of the steel pipe because the temperature in the economizer is not high enough.

SUMMARY OF THE INVENTION

The first technical problem to be solved by the present invention is to provide an HRSG for fluidized bed coal gasification. The inventive HRSG reduces abrasion of metal portions of the fire-tube boiler of the superheater, the low temperature evaporator, and the economizer caused by ashes in the raw syngas.

The second technical problem to be solved by the present invention is to provide an HRSG for fluidized bed coal gasification, which can avoid local overheating and overburning of the tube sheet and the fire tube assembly of the high temperature evaporator due to gases and steam produced by desalted water floating to the top of the fire tube assembly of the high temperature evaporator.

The third technical problem to be solved by the present invention is to provide an HRSG for fluidized bed coal gasification, which can save spaces occupied by the high temperature evaporator, superheater, low temperature evaporator, and economizer and avoid complicated and troublesome repairs and maintenances.

The fourth technical problem to be solved by the present invention is to provide an HRSG for fluidized bed coal gasification, which can avoid dew corrosion on the outer surface of the steel pipe of the economizer.

In order to solve the above technical problems, the present invention provides the following technical solutions:

An HRSG for fluidized bed coal gasification comprises a high temperature evaporator, a superheater, a low temperature evaporator and an economizer connected in series, wherein the superheater, the low temperature evaporator and the economizer have a water-tube structure and are vertically arranged, and the high temperature evaporator has a fire-tube structure. First, the raw syngas produced from the fluidized bed gasifier flows through the fire tube of the high temperature evaporator to heat the water, steam or mixture thereof outside the fire tube. Then, the flue gas flows through the shell sides of the superheater, the low temperature evaporator and the economizer in turn to heat the water, steam or the mixture thereof inside the tubes of the superheater, the low temperature evaporator and the economizer. The raw syngas goes through cooling and dust removal processes to produce clean syngas and then goes through refining processes in the next stage, such as desulfurizing and carbon-removal. In the present invention, the superheater, the low temperature evaporator and the economizer have water-tube structure, and the raw syngas is controlled at a relatively low speed, e.g. 2 m/s-8 m/s, by which the semi-cokes in the raw syngas will cause little abrasion of the metal portion of the superheater, the low temperature evaporator and the economizer, so that the first technical problem of the abrasion of the metal portion of the fire-tube boiler of the superheater, the low temperature evaporator and the economizer caused by the semi-cokes in the raw syngas is solved.

The present invention also solves the technical problem of quick abrasion of the fire-tube boiler of the high temperature evaporator by controlling the speed of the raw syngas through a fire-tube inlet of the high temperature evaporator, to be about e.g. 15 m/s-30 m/s. In the existing high temperature evaporator, the support element to support the fire-tube assembly often lacks sufficient thermal strength, and the metal material of the support element may suffer carburization and pulverization in the carbon monoxide and hydrogen-rich reducing environment. Therefore, the fire-tube assembly of the high temperature evaporator according to the present invention is connected with the shell of the high temperature evaporator through an upper and a lower tube sheets so that the fire-tube assembly is supported in the shell without the need of a high temperature support element.

During operation, due to the high temperature of the fire-tube wall (probably 200-400° C.) and low temperature of the shell of the high temperature evaporator, the fire tube and the shell of the high temperature evaporator have very different thermal expansions coupled with the big pressure difference between the upper and lower sides of the high temperature evaporator (e.g. >1.0 Mpa), the flat tube sheet of the prior art, having to deform to maintain connection and support, breaks easily. According to the present invention, the upper and lower tube sheets are of butterfly shaped, and the flexibility of the butterfly shape solves the technical problem of thermal expansion differential, and can function well under the condition of great pressure differences.

Another improvement achieved by the present invention is to use an inclined fire-tube boiler instead of the conventional straight fire-tube boiler to effectively avoid the problem of local overheating and overburning of the tube sheet and fire tube assembly due to gas and steam produced by desalted water floating to the top of the fire tube in a straight fire-tube boiler.

Another improvement achieved by the present invention is to place the high temperature evaporator, the superheater, the low temperature evaporator, and the economizer in one steel container to form a combined structure of the HRSG for fluidized bed coal gasification, which is compact to facilitate the management thereof.

The superheater, the low temperature evaporator, and the economizer are arranged coaxially, and separated by a suitable space between each other. The high temperature evaporator is inclined, wherein the axis of the fire-tube assembly forms an angle with the axis of the superheater, the low temperature evaporator and the economizer, of about 5-10 degrees.

Optionally, the high temperature evaporator, the superheater, the low temperature evaporator and the economizer may be divided into four sections and connected with each other through flanges, so that they can be easily drawn out independently like a drawer when the HRSG for fluidized bed coal gasification needs repair.

The high temperature evaporator is arranged on the top, the superheater is located below the high temperature evaporator, the low temperature evaporator is located below the superheater and the economizer is located below the low temperature evaporator.

According to the present invention, each of the superheater, the low temperature evaporator and the economizer comprises a shell and horizontally arranged coil tubes installed in the shell through a bracket. One or both sides along the axis of the horizontal coil tube assembly are provided with operation spaces for workers to enter to install, clean ashes and disassemble etc.

According to the present invention, the shell and horizontal coil tubes of the economizer are made of alloy steel to avoid dew corrosion on the outer surface of the steel pipe.

The present invention utilizes and combines the two ways of heat transmission and methods of steam production, whereby water is heated both outside a tube (wherein the flue gas flows inside the tube) and inside the tube (wherein the flue gas flows outside the tube), to accomplish both of sufficient heat recovery and reduction of abrasion of the tube and internal structure at the same time.

BRIEF DESCRIPTION OF THE DRAWINGS

Embodiments according to the present invention will be further described below in conjunction with the accompanying figures.

FIGS. 1 and 2 together shows that the HRSG of the present invention comprises: an HRSG upper inlet (100), a high temperature evaporator (200), including upper and lower tube sheets (230) having a dish-shaped periphery, a superheater (300), a low temperature evaporator (400), an economizer (500), and an HRSG lower outlet (600).

DETAILED DESCRIPTION OF THE PREFERRED EMBODIMENT

An embodiment according to the present invention is provided below in conjunction with the accompanying figures.

Figure 1:
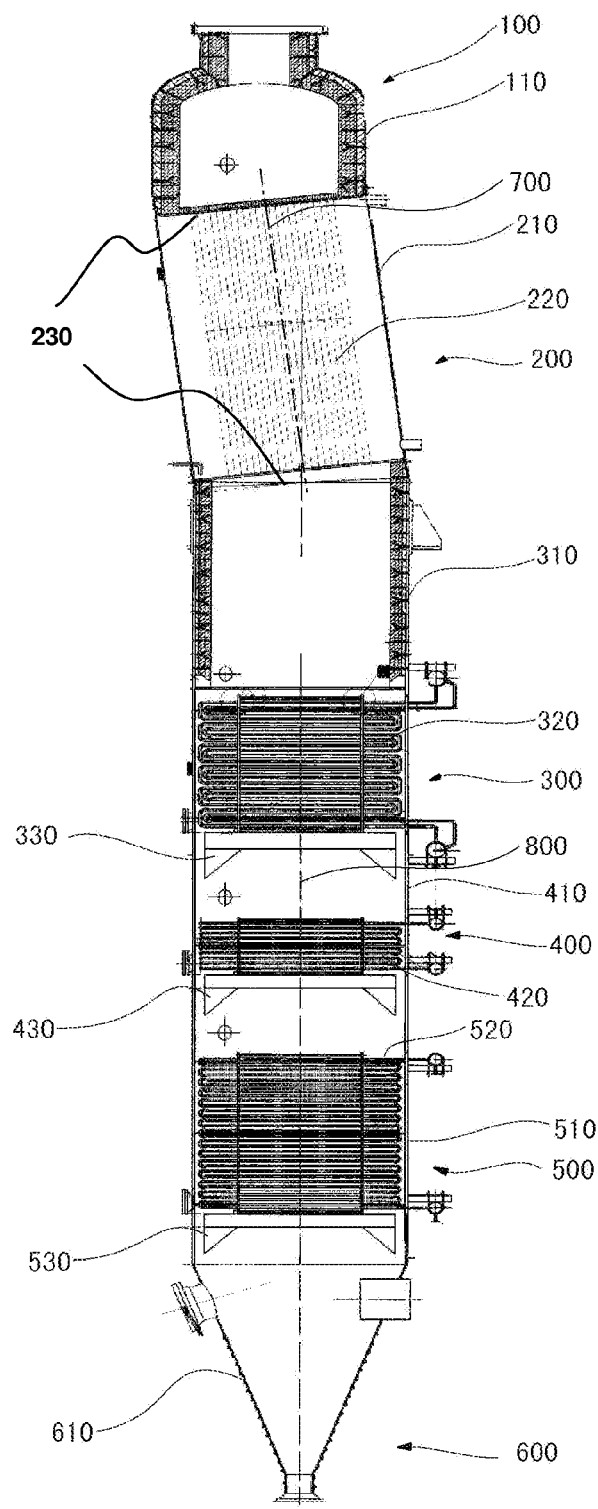
FIG. 1 shows the structure of the HRSG for fluidized bed coal gasification according to the present invention.

As shown in FIG. 1, an HRSG for fluidized bed coal gasification according to the present invention comprises six sections, i.e. an HRSG upper inlet 100, a high temperature evaporator 200, a superheater 300, a low temperature evaporator 400, an economizer 500 and an HRSG lower outlet 600, forming a combined structure. Specifically, the HRSG upper inlet 100 is located on the top of the HRSG, the high temperature evaporator 200 is arranged below the HRSG upper inlet 100, the superheater 300 is located below the high temperature evaporator 200, the low temperature evaporator 400 is located below the superheater 300, the economizer 500 is located below the low temperature evaporator 400, the HRSG lower outlet 600 is located at the bottom of the HRSG. The superheater 300, the low temperature evaporator 400, and the economizer 500 have a water-tube structure and the high temperature evaporator has a fire-tube structure. The raw syngas produced from the fluidized bed coal gasifier flows through a fire-tube assembly 220 of the high temperature evaporator 200 from the HRSG upper inlet 100, to heat water, steam or a mixture thereof outside the fire-tube assembly 220. Then, the raw syngas enters, in turn, the shell sides of the superheater 300, the low temperature evaporator 400, and the economizer 500 to heat the water, steam or the mixture thereof in the tube sides of the superheater 300, the low temperature evaporator 400 and the economizer 500. The raw syngas then goes through cooling and dust removal processes to produce clean syngas and exists via the HRSG lower outlet 600 to go through subsequent refining processes, such as desulfurizing and decarburizing. The superheater 300, the low temperature evaporator 400 and the economizer 500 have water-tube structure, and the raw syngas stream is controlled to be at a relatively low speed, e.g. 2 m/s-8 m/s, by which the ash particles and semi-cokes in the raw syngas will cause little abrasion of the metal portions of the superheater 300, the low temperature evaporator 400 and the economizer 500.

Figure 2:
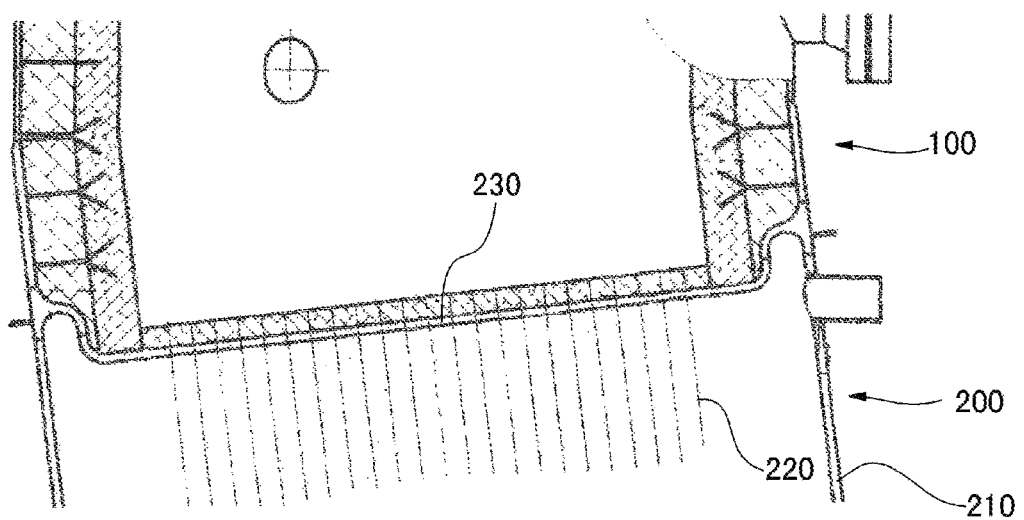
FIG. 2 shows a connection of the high temperature evaporator and the upper inlet of the HRSG according to the present invention.

The present invention also controls the raw syngas through the inlet of the fire-tube assembly 220 of the high temperature evaporator 200 at a speed of e.g. 15 m/s-30 m/s to solve the technical problem of quick abrasion of the fire-tube assembly 220 of the high temperature evaporator 200. Those skilled in the art can control the inlet speed of the raw syngas by techniques in the prior art, e.g. valves, and other device for gas speed adjustment etc. As shown in FIG. 2, the fire-tube assembly 220 in the high temperature evaporator 200 is connected with the shell 210 of the high temperature evaporator 200 through upper and lower tube sheets 230 without using any specially designed support element for high temperature to support fire-tube assembly 220. The upper and lower tube sheets 230 are dish-shaped at the periphery and the flexibility of the tube sheets 230 solves the technical problem of different thermal expansions between the fire-tube assembly 220 and the shell 210 of the temperature evaporator 200.

The superheater 300, the low temperature evaporator 400, and the economizer 500 are arranged coaxially, with an axis 800 and separated by a suitable space from each other. The high temperature evaporator 200 is inclined, whose axis 700 forms an angle of about 5-10 degrees with the axis 800 of the superheater 300, the low temperature evaporator 400, and the economizer 500 to avoid the problem of local overheating and overburning.

The superheater 300, the low temperature evaporator 400 and the economizer 500 comprise shells 310, 410, 510 and horizontal coil tubes 320, 420, 520 respectively installed in the shells 310, 410, 510 through brackets 330, 430, 530. One or both sides along the axis of the horizontal coil tubes 320, 420, 520 have operation spaces (not shown in the figures) for workers to install, clean ashes and disassemble etc.

As shown in FIG. 1, the shell 110 of the HRSG upper inlet 100, the shell 210 of the high temperature evaporator 200, the shell 310 of the superheater 300, the shell 410 of the low temperature evaporator 400, the shell 510 of the economizer 500 and the shell 610 of the HRSG lower outlet 600 can be made into one steel container. The fire-tube assembly 220 of the high temperature evaporator 200, the horizontal coil tube 320 of the superheater 300, the horizontal coil tube 420 of the low temperature evaporator 400, and the horizontal coil tube 520 of the economizer 500 are installed in such a steel container, which is compact to facilitate the management thereof.

Alternatively, the HRSG upper inlet 100, the high temperature evaporator 200, the superheater 300, the low temperature evaporator 400, the economizer 500 and the HRSG lower outlet 600 are divided into six sections and connected so that they can be separately drawn out like a drawer when the HRSG needs repair.

According to the present invention, the shell 510 and horizontal coil tube 520 of the economizer 500 may be made of alloy steel to avoid dew corrosion on the outer surface of the steel pipe caused by water at room temperature.

In this embodiment, water in the tubes of the superheater 300, the low temperature evaporator 400 and the economizer 500 with water-tube structure is heated by exchanging heat with flue gas outside the tubes, and enters a steam drum by the pressure difference between the water (from a boiler feed water pump) and the steam drum (not shown in the figures); the steam drum is connected with the high temperature evaporator 200 with fire-tube structure through a riser and a downcomer, and steam-liquid mixture of water circulate between the steam drum and the high temperature evaporator 200 to continuously produce saturated steam.

Raw syngas produced from fluidized bed coal gasification process at a temperature of 1000° C. enters the HRSG of the present invention through the HRSG upper inlet 100 and flows through the fire-tube assembly 220 of the high temperature evaporator 200 to heat hot water outside the fire-tube assembly 220 from the steam drum. Then, the flue gas after preliminary cooling (to about 800° C.) enters in turn the shell sides of the superheater 300 (about 600° C. at the outlet), the low temperature evaporator 400 (about 400° C. at the outlet) and the economizer 500 (about 220° C. at the outlet) to heat water, steam or the mixture thereof in the tube sides. The raw syngas goes through the cooling and dust removal processes to produce clean syngas and then goes through refining processes in the next stage, such as desulfurizing and carbon-removal.

The HRSG according to the present invention can be used in a pressurized fluidized bed boiler and a coal gasifier. In particular, the HRSG according to the present invention can be used under the industrial conditions of high temperature (1100° C.), heavy ashes (coal ashes and semi-cokes with high concentration of several hundreds $g/m^3$) and high pressure (3.0 Mpa) to produce water gas with high humidity (37%).

What is claimed is:

1. A heat recovery steam generator (HRSG) for fluidized bed gasification,
    wherein the HRSG comprises from top to bottom a raw syngas inlet, a high temperature evaporator, a superheater, a low temperature evaporator and an economizer connected vertically in series,
    wherein each of the superheater, the low temperature evaporator and the economizer comprises a water-tube structure, and the high temperature evaporator comprises a fire-tube structure;
    wherein the high temperature evaporator comprises a fire tube assembly encased in a shell, wherein the fire tube assembly is connected with the shell through an upper tube sheet and a lower tube sheet, and wherein the fire tube assembly and the shell are arranged coaxially along a first axis;
    wherein the superheater, the low temperature evaporator and the economizer are arranged coaxially along a second axis perpendicular to the ground; and
    wherein the first axis is inclined and forms an angle of about 5-10 degrees in relation to the second axis.

2. The HRSG for fluidized bed gasification according to claim 1, further comprising a steel container enclosing the high temperature evaporator, the superheater, the low temperature evaporator and the economizer to form a combined structure.

3. The HRSG for fluidized bed gasification according to claim 1, wherein the upper and lower tube sheets are dish shaped in their periphery.

4. The HRSG for fluidized bed gasification according to claim 3, wherein each of the superheater, the low temperature evaporator and the economizer comprises a shell and a horizontal coil tube assembly installed in the shell, and at least one operation space which is located in the shell next to the horizontal coil tube assembly.

5. The HRSG according to claim 4, wherein the shell and the horizontal coil tube assembly of the economizer are made of alloy steel.

6. A method for recovering heat from hot raw syngas under pressure exiting a fluidized bed coal gasifier, comprising feeding the hot raw syngas into the raw syngas inlet of an HRSG according to claim 1, wherein the speed of the raw syngas entering the high temperature evaporator is controlled to a speed of about 15 m/s to about 30 m/s.

7. The method according to claim 6, wherein the speed of the raw syngas is further controlled to exit the high temperature evaporator at a speed of about 2 m/s to about 8 m/s.

* * * * *